US012802668B2

(12) United States Patent
Sato

(10) Patent No.: US 12,802,668 B2
(45) Date of Patent: Nov. 17, 2026

(54) REED AND MANUFACTURING METHOD THEREOF

(71) Applicant: YAMAHA CORPORATION, Hamamatsu (JP)

(72) Inventor: Akiko Sato, Iwata (JP)

(73) Assignee: YAMAHA CORPORATION, Hamamatsu (JP)

( * ) Notice: Subject to any disclaimer, the term of this patent is extended or adjusted under 35 U.S.C. 154(b) by 323 days.

(21) Appl. No.: 18/604,876

(22) Filed: Mar. 14, 2024

(65) Prior Publication Data

US 2024/0312438 A1 Sep. 19, 2024

(30) Foreign Application Priority Data

Mar. 16, 2023 (JP) ................................. 2023-041923

(51) Int. Cl.

| | |
|---|---|
| ***G10D 9/035*** | (2020.01) |
| ***B32B 7/022*** | (2019.01) |
| ***B32B 27/08*** | (2006.01) |
| ***B32B 43/00*** | (2006.01) |
| ***G10D 9/08*** | (2020.01) |

(52) U.S. Cl.

CPC ............. *G10D 9/035* (2020.02); *B32B 7/022* (2019.01); *B32B 27/08* (2013.01); *B32B 43/003* (2013.01); *G10D 9/08* (2020.02); *B32B 2307/51* (2013.01)

(58) Field of Classification Search

CPC ........... G10D 9/035; G10D 9/08; G10D 7/06; G10D 7/10; G10D 7/12; G10D 9/01; G10D 9/02; G10D 7/00; B32B 7/022; B32B 27/08; B32B 43/003; B32B 2307/51; B32B 7/035; B32B 2307/516; B32B 2307/706; B32B 38/0004; B32B 38/1808

See application file for complete search history.

(56) References Cited

U.S. PATENT DOCUMENTS

| | | | |
|---|---|---|---|
| 2009/0301284 | A1 | 12/2009 | Legere et al. |
| 2017/0263219 | A1 | 9/2017 | Van Doren |

FOREIGN PATENT DOCUMENTS

| | | | | |
|---|---|---|---|---|
| JP | 2001075556 A | 3/2001 | | |
| JP | 2017134158 A | 8/2017 | | |
| JP | 2022011035 A | 1/2022 | | |
| WO | 2017051751 A1 | 3/2017 | | |
| WO | WO-2022004310 A1 * | 1/2022 | ............. | G10D 9/035 |

OTHER PUBLICATIONS

Extended European Search Report issued in European Appln. No. 24163818.8, mailed Jul. 25, 2024.

Request for the Submission of an Opinion issued in Korean Appln. No. 10-2024-0015947 mailed Mar. 30, 2026.

Communication pursuant to Article 94(3) EPC issued in European Appln. No. 24163818.8 mailed Apr. 16, 2026.

* cited by examiner

*Primary Examiner* — Kimberly R Lockett

(74) *Attorney, Agent, or Firm* — ROSSI, KIMMS & McDOWELL LLP

(57) ABSTRACT

According to an embodiment, a reed for an aerophone, the reed including a plurality of plastic sheets laminated in a lamination direction perpendicular to a longitudinal direction of the reed is provided, and an elastic modulus in the longitudinal direction of at least one plastic sheet of the plurality of plastic sheets is greater than an elastic modulus in a direction perpendicular to both the lamination direction and the longitudinal direction of the at least one plastic sheet.

16 Claims, 7 Drawing Sheets

REED AND MANUFACTURING METHOD THEREOF

CROSS-REFERENCE TO RELATED APPLICATIONS

This application claims the benefit of priority to Japanese Patent Application No. 2023-041923, filed on Mar. 16, 2023, the entire contents of which are incorporated herein by reference.

FIELD

The present disclosure relates to a reed of a wind instrument and a manufacturing method thereof.

BACKGROUND

A reed attached to a mouthpiece of a wind instrument is formed by a plant material commonly referred to as canes. In recent years, for example, a reed formed of a resin material has also been developed as disclosed in Japanese Laid-Open Patent Publication No. 2001-075556.

SUMMARY

According to an embodiment of the present disclosure, there is provided a reed for an aerophone, the reed including a plurality of plastic sheets laminated in a lamination direction perpendicular to a longitudinal direction of the reed, wherein an elastic modulus in the longitudinal direction of at least one plastic sheet of the plurality of plastic sheets is greater than an elastic modulus in a direction perpendicular to both the lamination direction and the longitudinal direction of the at least one plastic sheet.

According to an embodiment of the present disclosure, there is provided a reed manufacturing method, the method including preparing a plurality of plastic sheets, each plastic sheet of the plurality of plastic sheets having anisotropy, forming a laminate by laminating the plurality of plastic sheets with the anisotropy aligned, and cutting out a plate from the laminate to form the reed such that an elastic modulus in a longitudinal direction of the reed is greater than an elastic modulus in a short direction of the reed perpendicular to the longitudinal direction of the reed.

DESCRIPTION OF EMBODIMENTS

Figure 1:
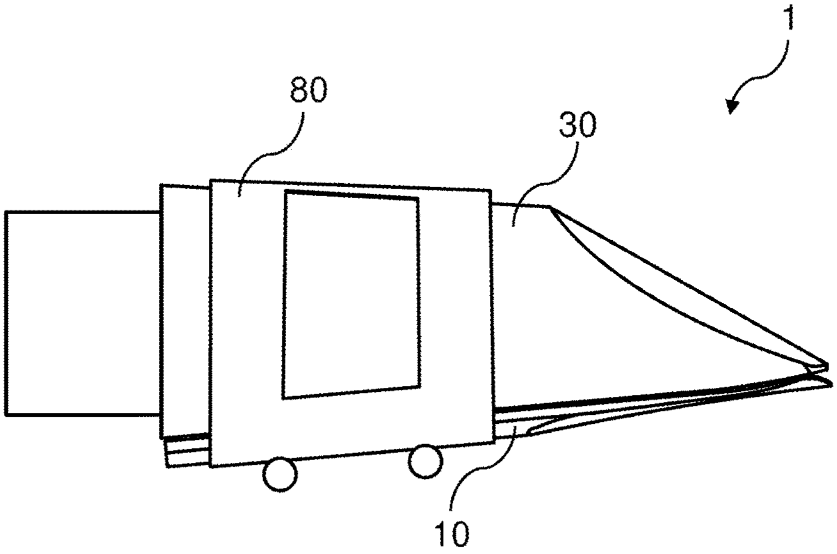
FIG. 1 is a view showing a blowing part according to an embodiment.

A reed formed of a plant material (hereinafter referred to as a plant-based reed) is different in physical properties from a reed formed of a resin material (hereinafter referred to as a resin derived reed). Specifically, the plant-based reed is characterized in that, at its tip, rigidity in a lateral direction substantially orthogonal to an extending direction (longitudinal direction) of the reed body is relatively low compared to rigidity in the longitudinal direction, and elastic modulus in the lateral direction is low and is easy to bent compared to the longitudinal direction. Such anisotropy of the rigidity allows the plant-based reed to realize a variety of tones. On the other hand, unlike the plant-based reed, the resin derived reed has no anisotropy of the rigidity in the longitudinal direction and the lateral direction. Therefore, the resin derived reed cannot reproduce the tone of the plant-based reed. It is desired to realize various tones by the resin derived reed, including making a sound generation by the resin derived reed closer to a sound generation by the plant-based reed.

It is difficult to impart anisotropy of a desired rigidity to a resin derived reed that is cut out from a resin material or is produced by injection molding.

According to the present disclosure, various tones can be realized by a reed formed of a material other than plant material.

Hereinafter, an embodiment of the present disclosure will be described in detail with reference to the drawings. The following embodiments are examples, and the present disclosure should not be construed as being limited to these embodiments. In the drawings referred to in the present embodiment, the same or similar parts are denoted by the same reference signs or similar reference signs (only denoted by A, B, and the like after the numerals), and repetitive description thereof may be omitted. In the drawings, dimensional ratios may be different from actual ratios, or a part of the configuration may be omitted from the drawings for clarity of explanation.

For example, a blowing part according to an embodiment is a single-reed blowing part used in a saxophone, and includes a reed. The reed is formed of a resin material.

First Embodiment

[Configuration of Reed]

Figure 2:
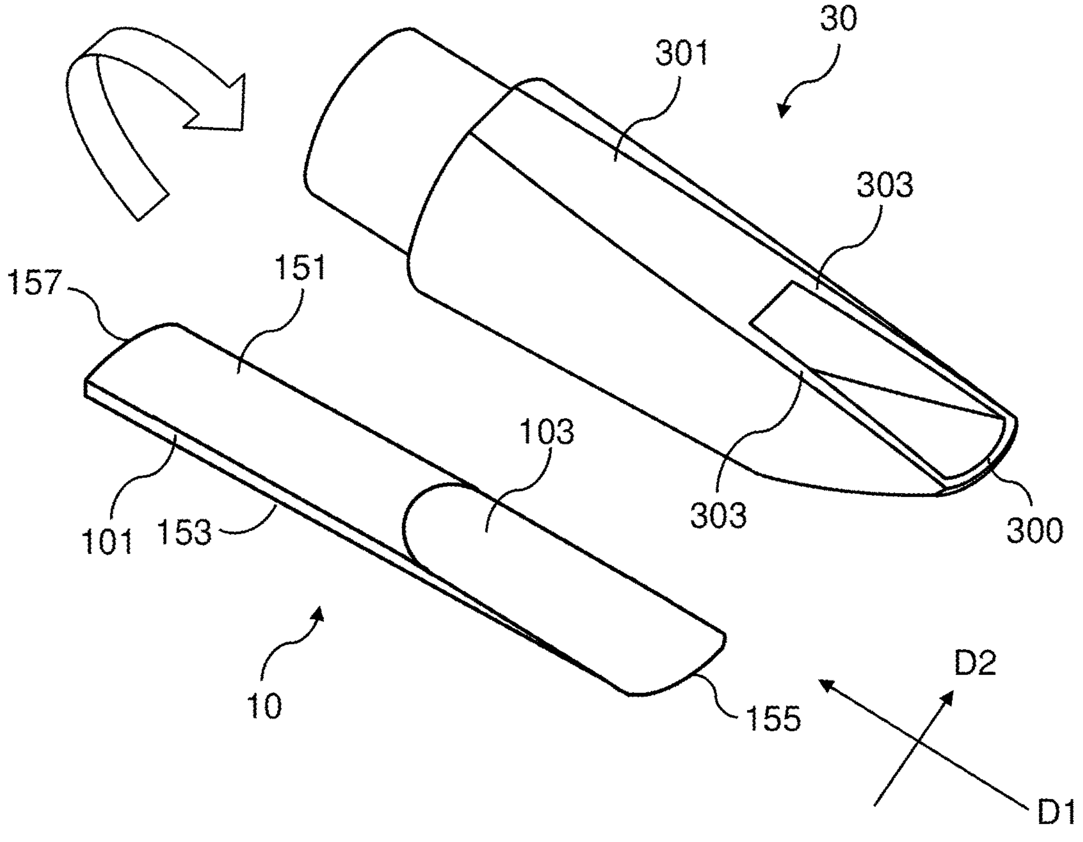
FIG. 2 shows a reed and a mouthpiece according to an embodiment.

FIG. 1 is a diagram showing a blowing part 1 according to a first embodiment of the present disclosure. FIG. 1 shows an example in which the blowing part 1 is viewed from a side. FIG. 2 is a diagram showing a reed 10 and a mouthpiece 30 according to the present embodiment.

As shown in FIG. 1, the blowing part 1 includes a reed 10, a mouthpiece 30, and a ligature 80. The ligature 80 is a member that fixes the reed 10 and the mouthpiece 30.

As shown in FIG. 2, the mouthpiece 30 includes a table 301, side rails 303, and a tip rail 300. Two side rails 303 extend from the table 301. The tip rail 300 extends from the two side rails 303. The tip rail 300 is disposed at an end portion of the side rails 303.

The reed 10 includes a substrate part 101 and a vamp 103. As shown in FIG. 2, the substrate part 101 includes a planar portion 151, a back surface 153, and a heel 157. The planar portion 151 is disposed on at least one surface of the substrate part 101. The back surface 153 is a surface opposite to the planar portion 151. In this example, the back surface 153 corresponds to at least a portion of a plane that contacts the table 301 when attached to the mouthpiece 30. The heel 157 is an end portion of the substrate part 101 located on the opposite side from the vamp 103.

The vamp 103 extends from the substrate part 101 on the opposite side from the heel 157. That is, the vamp 103 is disposed at one end of the reed 10 in a longitudinal direction D1. The vamp 103 has a tip 155 on the opposite side from the substrate part 101 and gradually decreases in thickness towards the tip 155.

The reed 10 is formed of a resin material and includes a longitudinal side and a short side. The longitudinal direction D1 and a short direction D2 of the reed 10 are perpendicular to each other. Elastic modulus of the reed 10 in the longitudinal direction D1 is relatively greater than elastic modulus of the reed 10 in the short direction D2. The elastic modulus in the longitudinal direction D1 of the reed 10 is equal to or greater than 1.1 times and equal to or less than 2.0 times the elastic modulus in the short direction D2 of the reed 10. In other words, rigidity of the reed 10 in the longitudinal direction D1 is relatively higher than rigidity of the reed 10 in the short direction D2.

Figure 3:
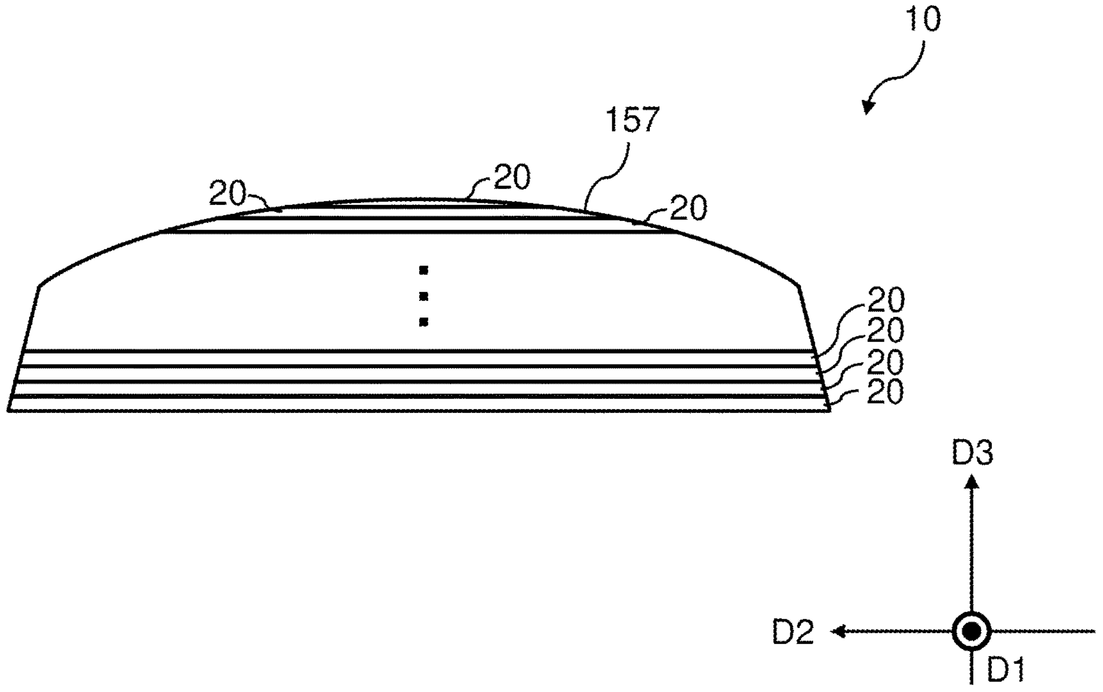
FIG. 3 is an enlarged longitudinal view of a heel of a reed according to an embodiment.

FIG. 3 is an enlarged view of the heel 157 of the reed 10 shown in FIG. 2 as viewed from the longitudinal direction D1. As shown in FIG. 3, the reed 10 includes a plurality of plastic sheets 20. The reed 10 is formed of a laminate in which the plurality of plastic sheets 20 is laminated to each other. The plurality of plastic sheets 20 is laminated along a thickness direction D3 of the reed 10, perpendicular to both the longitudinal direction D1 and the short direction D2 of the reed 10. That is, in the present embodiment, a lamination direction of the plurality of plastic sheets 20 corresponds to the thickness direction D3 of the reed 10.

Figure 4:
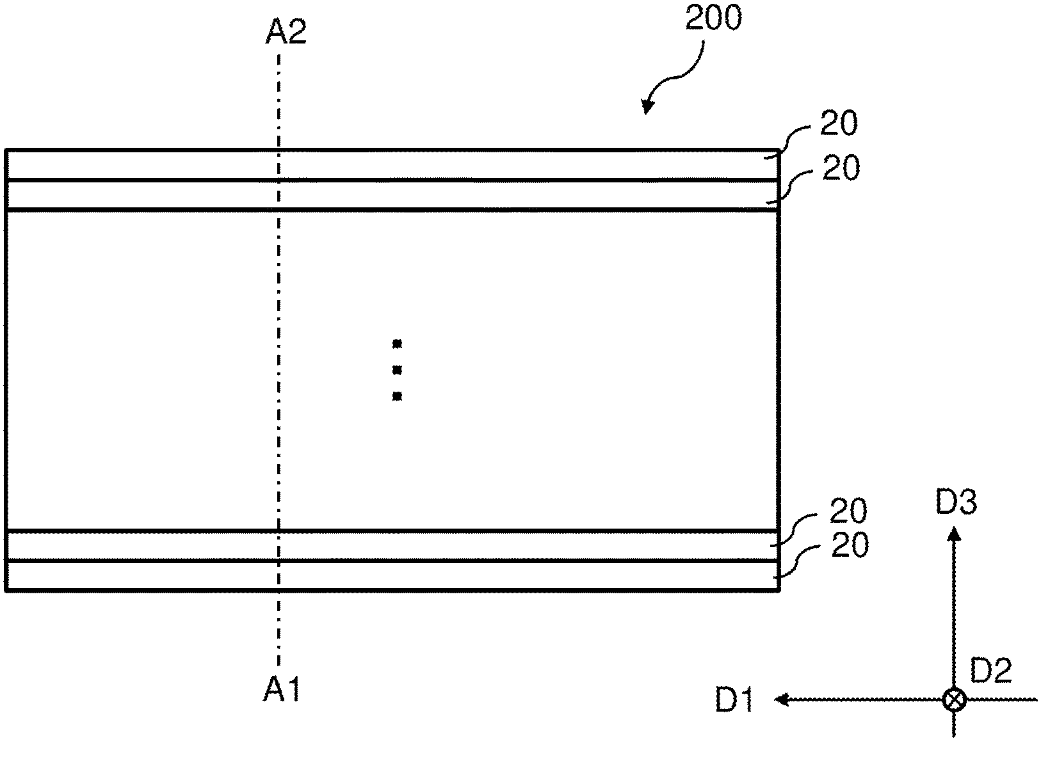
FIG. 4 is a schematic diagram showing a laminate including a plurality of plastic sheets according to an embodiment.

FIG. 4 is a schematic diagram showing a side view of a laminate 200 including the plurality of plastic sheets 20. The laminate 200 includes about 5 to about 200 plastic sheets 20 laminated to each other. The plastic sheet 20 may be, but is not limited to, an LCP (Liquid Crystal Polymer) sheet having anisotropy of rigidity. As the plastic sheet 20, a resin sheet having anisotropy of rigidity, such as PC (polycarbonate), PP (polypropylene), ABS (Acrylonitrile-butadiene-styrene), TPI (thermoplastic polyimide), PEI (polyetherimide), or the like, or a resin sheet easily having anisotropy of rigidity, is used in addition to LCP. A thickness of the plastic sheet 20 is not limited, but is usually equal to or greater than 5 μm and equal to or less than 5 mm, preferably equal to or greater than 10 μm and equal to or less than 1 mm, and more preferably equal to or greater than 20 μm and equal to or less than 200 μm. Here, the thickness of the plastic sheet 20 is a thickness along the lamination direction of the plastic sheet 20 in the laminate 200.

The laminate 200 including the plurality of plastic sheets 20 may include configurations other than the plastic sheets 20. The laminate 200 may include any layer interposed between two adjacent plastic sheets 20. Although not shown, for example, the laminate 200 may include an adhesive layer interposed between two adjacent plastic sheets 20. In addition, the laminate 200 may include a sheet made of another type of resin different from the plurality of plastic sheets 20.

Among the plurality of plastic sheets 20 constituting the reed 10, at least one plastic sheet 20 has a stretching direction and a non-stretching direction. Both the stretching direction and the non-stretching direction are perpendicular to the thickness direction D3 of the reed 10, that is, the lamination direction of the plurality of plastic sheets 20, and the stretching direction and the non-stretching direction are perpendicular to each other. Elastic modulus of the plastic sheet 20 in the stretching direction is relatively larger than elastic modulus of the plastic sheet 20 in the non-stretching direction. In other words, rigidity of the plastic sheet 20 in the stretching direction is relatively higher than rigidity in the non-stretching direction. In the plastic sheet 20, the elastic modulus in the stretching direction (a longitudinal direction) is equal to or greater than 1.1 times and equal to or less than 2.0 times the elastic modulus in the non-stretching direction (a short direction).

For example, in each of the plastic sheets 20 constituting the laminate 200 shown in FIG. 4, the longitudinal direction D1 of the reed 10 corresponds to the stretching direction of the plastic sheet 20, and the short direction D2 of the reed 10 corresponds to a non-stretching direction of the plastic sheet 20. When the reed 10 is cut out from the laminate 200, the reed 10 is cut out from the laminate 200 such that the stretching direction of each of the plastic sheets 20 matches the longitudinal direction D1 of the reeds 10 and the non-stretching direction matches the short direction D2 of the reed 10.

The reed 10 is cut out from the laminate 200 by cutting the laminate 200. As shown in FIG. 3, in the case where the thickness direction D3 of the reed 10 and the lamination direction of the plurality of plastic sheets 20 constituting the reed 10 match, the plate-shaped reed 10 is cut out from the laminate 200 so that long and short sides of the reed 10 are located in a direction perpendicular to the lamination direction of the plurality of plastic sheets 20 in the laminate 200. Here, the elastic modulus of the reed 10 in the longitudinal direction D1 is larger than the elastic modulus of the reed 10 in the short direction D2. In other words, the rigidity of the reed 10 in the longitudinal direction D1 is greater than the rigidity of the reed 10 in the short direction D2. Depending on a size of the plastic sheet 20, a plurality of reeds 10 can be cut out from one laminate 200.

Figure 5:
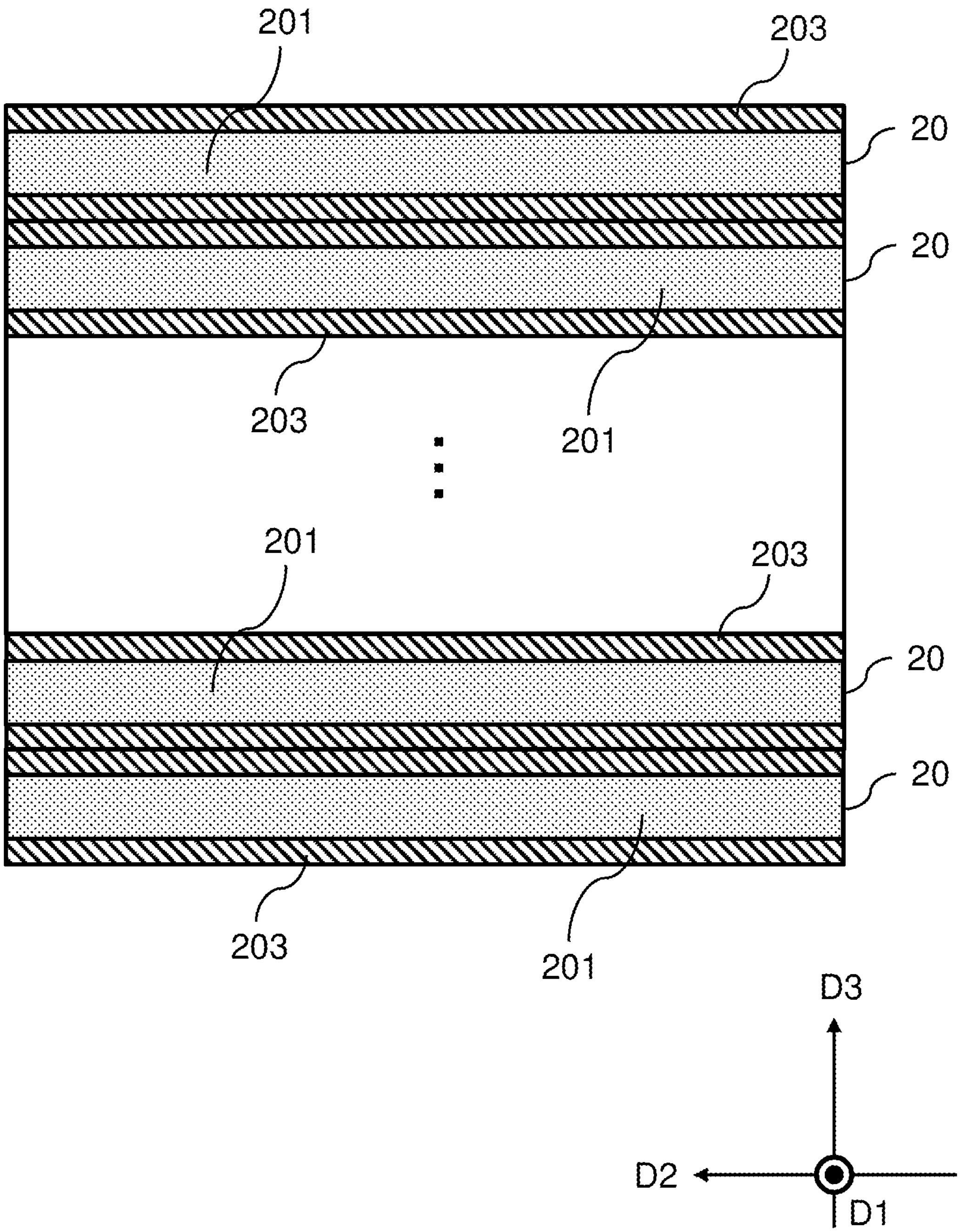
FIG. 5 is an example of a cross-sectional view of a laminate of plastic sheets along A1-A2 in FIG. 4.

FIG. 5 is a cross-sectional view of the laminate 200 shown in FIG. 4 taken along A1-A2 line along a plane defined by the short direction D2 and the thickness direction D3 of the reed 10. FIG. 5 shows a cross-sectional view as viewed from the longitudinal direction D1 of the reed 10. As shown in FIG. 5, the plastic sheet 20 includes a first layer 201 and a second layer 203. The second layer 203 adjoins the first layer 201 in the lamination direction of the plurality of plastic sheets 20 (that is, the thickness direction D3 of the reed 10). Anisotropy of elastic modulus of the first layer 201 of the plastic sheet 20 is different from anisotropy of elastic modulus of the second layer 203. For example, the anisotropy of the elastic modulus of the second layer 203 may be larger than the anisotropy of the elastic modulus of the first layer 201. Alternatively, conversely, the anisotropy of the elastic modulus of the first layer 201 may be larger than the anisotropy of the elastic modulus of the second layer 203. By forming the laminate 200 by laminating the plurality of such plastic sheets 20, the first layer 201 and the second layer 203 are alternately located in at least a part of the laminate 200 along the lamination direction of the plastic sheets 20.

In the case where two or more plastic sheets 20 constituting the reed 10 have anisotropy of rigidity, the plastic sheets 20 may be laminated so that directions in which the anisotropy of rigidity is relatively strong are aligned. As a result, the laminate 200 having anisotropy of rigidity can be formed.

In the case of adjusting the anisotropy of the rigidity of the laminate 200, when the plurality of plastic sheets 20 are laminated, the plurality of plastic sheets 20 may be laminated so that the directions in which the anisotropy of the rigidity is relatively strong are not intentionally aligned. Further, by interposing another member between the plurality of plastic sheets 20, it is possible to adjust anisotropy of rigidity of the laminate 200. Further, by making the thickness of the plastic sheet 20 thinner and increasing a number of laminated plastic sheets 20 in the laminate 200, it is possible to adjust a ratio of the first layer 201 or the second layer 203 having a relatively large anisotropy of rigidity in the laminate 200 and to adjust the anisotropy of the rigidity of the laminate 200.

As described above, by laminating the plurality of plastic sheets 20 having the anisotropy of the rigidity, the laminate 200 having the anisotropy in the rigidity is formed. The reed 10 cut out from this laminate 200 has anisotropy in rigidity as the laminate 200. In other words, anisotropy of rigidity similar to anisotropy of rigidity of the plant-based reed can be imparted to the reed 10. Therefore, the reed 10 can realize the same tone as that of the plant-based reed.

Further, the anisotropy of the rigidity of the reed 10 is realized not only by a surface of the reed 10 but also by the plurality of plastic sheets 20 constituting the reed 10. Therefore, even if the reed 10 is surface-treated and the surface of the reed 10 is scraped in order to form the vamp 103 or the like after the reed 10 is cut out from the laminate 200, the anisotropy of the rigidity of the reed 10 is maintained.

[Manufacturing Method]

Figure 6:
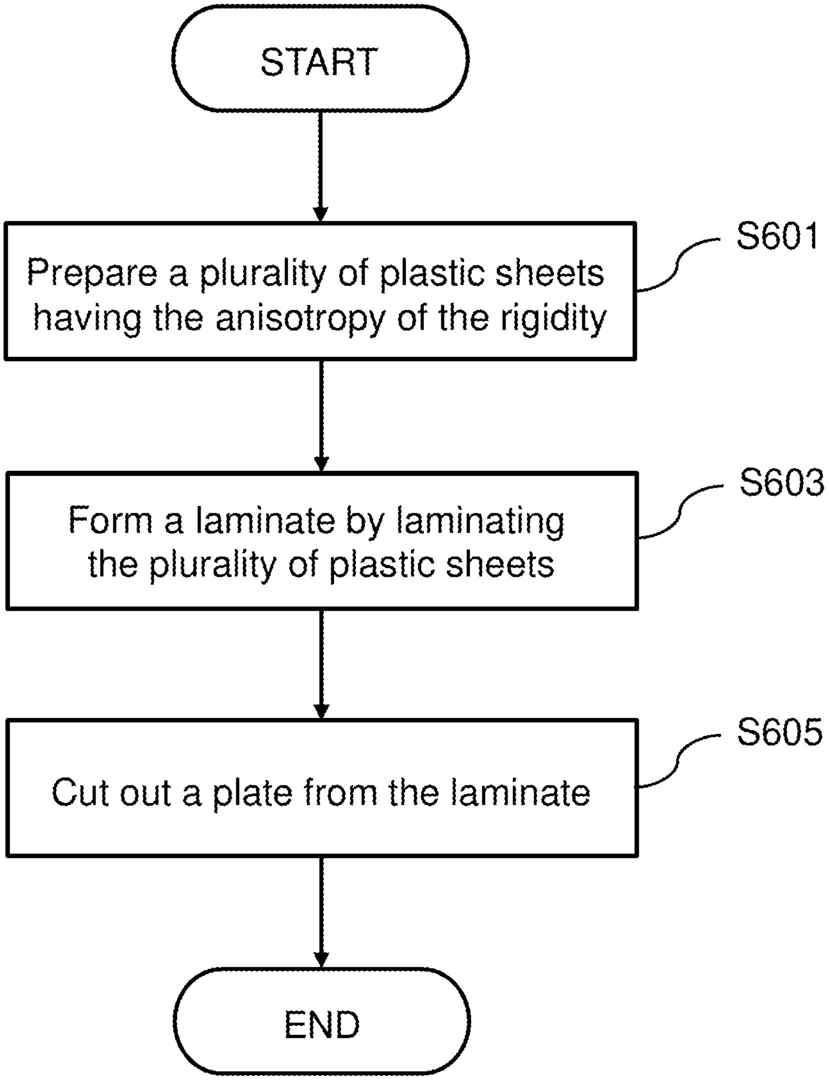
FIG. 6 is a flowchart showing an example of a reed manufacturing method according to an embodiment.
Figure 7:
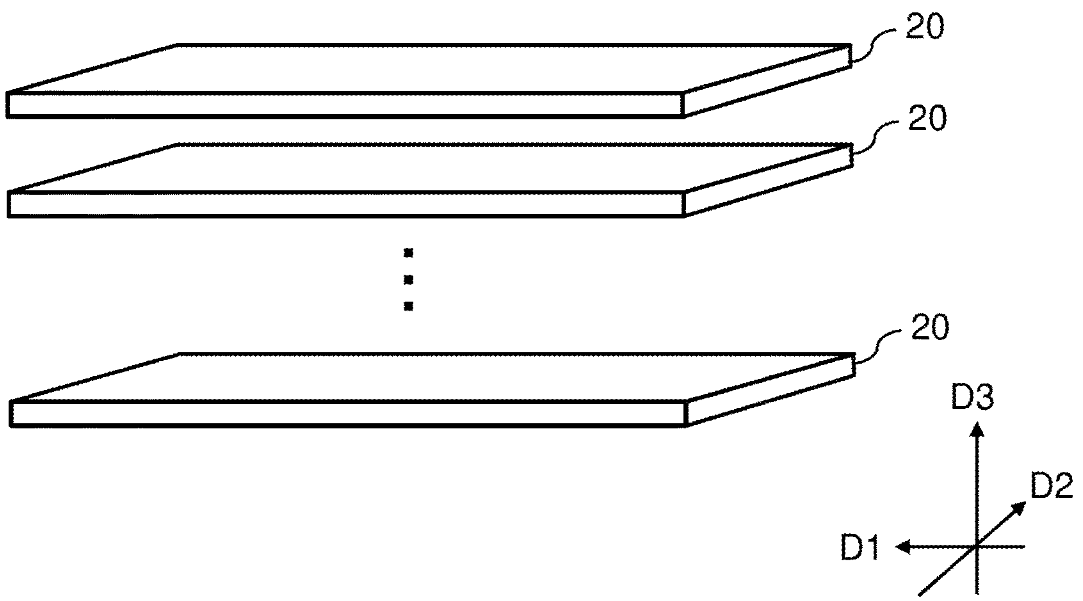
FIG. 7 is a diagram for explaining a reed manufacturing process according to an embodiment.
Figure 8:
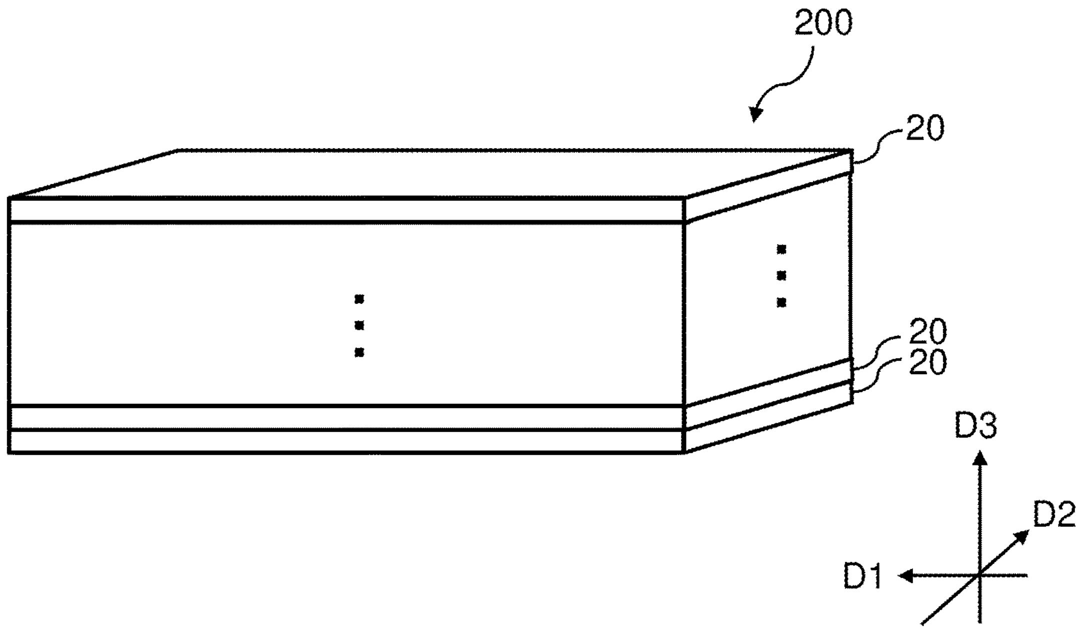
FIG. 8 is a diagram for explaining a reed manufacturing process according to an embodiment.
Figure 9:
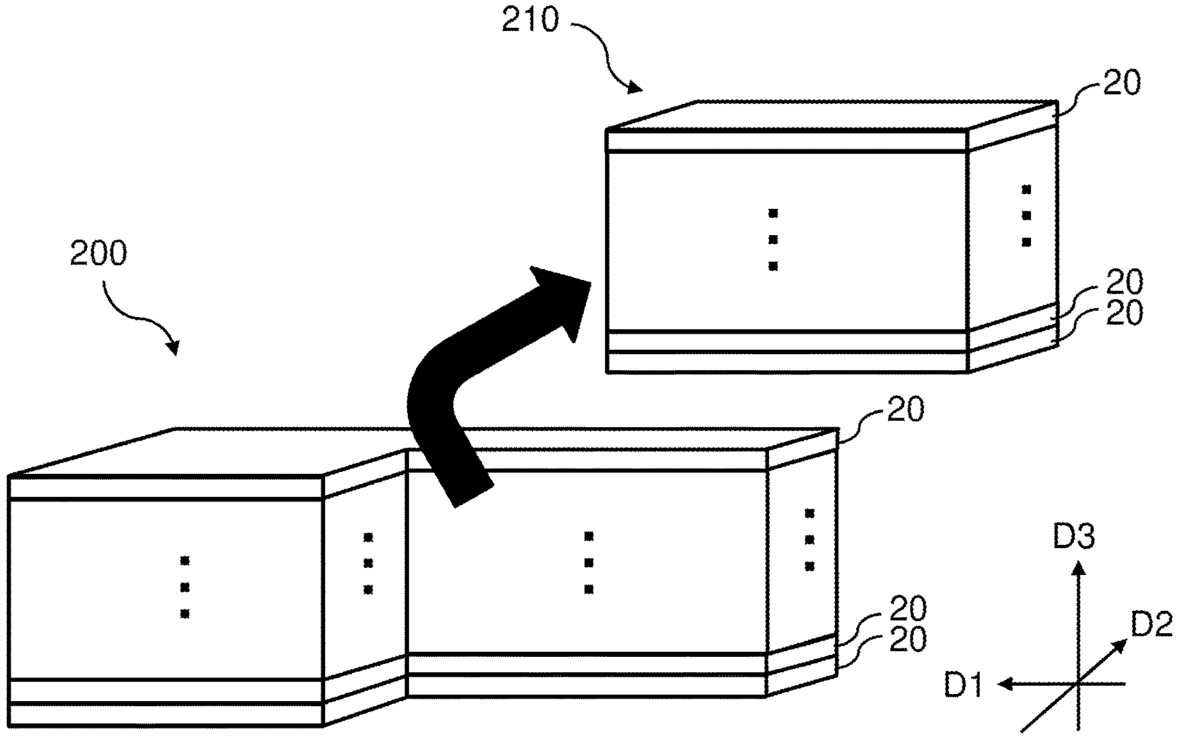
FIG. 9 is a diagram for explaining a reed manufacturing process according to an embodiment.

FIG. 6 is a flowchart showing an example of a method of manufacturing the reed 10 according to the present embodiment. FIG. 7 to FIG. 9 are diagrams for explaining a manufacturing process of the reed 10.

First, as shown in FIG. 6 and FIG. 7, the plurality of plastic sheets 20 having the anisotropy of the rigidity is prepared (S601). For example, the plastic sheet 20 is prepared from about 5 sheets to about 200 sheets. In each of the plastic sheets 20, the elastic modulus in the stretching direction is larger than the elastic modulus in the non-stretching direction. Here, the elastic modulus of the plastic sheet 20 in the stretching direction is equal to or greater than 1.1 times and equal to or less than 2.0 times the elastic modulus in the non-stretching direction.

The configuration of the plastic sheet 20 includes the first layer 201 and the second layer 203 adjacent to the first layer 201, as described with reference to FIG. 5. The anisotropy of the elastic modulus of the first layer 201 is different from the anisotropy of the elastic modulus of the second layer 203. The second layer 203 is adjacent to the first layer 201 in the lamination direction of the plurality of plastic sheets 20.

Next, as shown in FIG. 6 and FIG. 8, the plurality of plastic sheets 20 are laminated in a direction perpendicular to both the stretching direction and the non-stretching direction to form the laminate 200 (S603). The lamination direction of the plurality of plastic sheets 20 corresponds to the thickness direction D3 of the reed 10. At this time, the plurality of plastic sheets 20 may be laminated so that the anisotropy of the rigidity of each of the plurality of plastic sheets 20 is aligned. Specifically, the plurality of plastic sheets 20 may be laminated so that the directions in which the anisotropy of the rigidity of each of the plurality of plastic sheets 20 is relatively strong are aligned.

Further, in order to adjust the anisotropy of the rigidity of the laminate 200, when the plurality of plastic sheets 20 are laminated, the plurality of plastic sheets 20 may be laminated so that the directions in which the anisotropy of the rigidity is relatively strong are not intentionally aligned. Elastic modulus in a longitudinal direction of the laminate 200 in which the plurality of plastic sheets 20 are laminated is equal to or greater than 1.1 times and equal to or less than 2.0 times elastic modulus in a short direction.

Although not shown in the drawing, the laminate 200 may include a member interposed between two adjacent plastic sheets 20 of the plurality of plastic sheets 20. The member interposed between the two plastic sheets 20 may be a sheet made of another type of resin, an adhesive layer, or the like, which is different from the plastic sheet 20.

The plurality of plastic sheets 20 may be bonded to each other by being crimped. Various conditions such as temperature, pressure, and press time when the plurality of plastic sheets 20 are crimped are appropriately set in accordance with a type of resin used for the plastic sheet 20. In addition, the plurality of plastic sheets 20 may be bonded to each other by an adhesive interposed between two adjacent plastic sheets 20.

Next, as shown in FIG. 6 and FIG. 9, a plate 210 is cut out from the laminate 200 by cutting process (S605). In this case, the plate 210 is cut out from the laminate 200 such that a longitudinal direction of the plate 210 matches the longitudinal direction of the laminate 200 and a short direction of the plate 210 matches the short direction of the laminate 200. That is, the plate 210 is cut out along a direction perpendicular to the lamination direction in which the plurality of plastic sheets 20 are laminated in the laminate 200. Therefore, elastic modulus of the plate 210 in the longitudinal direction is larger than elastic modulus of the plate 210 in the short direction.

The plate 210 cut out by process of S605 becomes the reed 10. That is, the longitudinal direction D1 of the reed 10 and the longitudinal direction of the plate 210 march each other, and the short direction D2 of the reed 10 and the short direction of the plate 210 match each other. Although not shown in the drawing, the plate 210 may be treated on its surface to form the vamp 103 or the like of the reed 10. The above is the manufacturing method of the reed 10 according to the present embodiment.

Second Embodiment

A reed 10A according to a second embodiment of the present disclosure will be described. An exterior of the reed 10A is the same as the reed 10 according to the first embodiment shown in FIG. 2. Hereinafter, the reed 10A differing from the reed 10 according to the first embodiment is explain.

Figure 10:
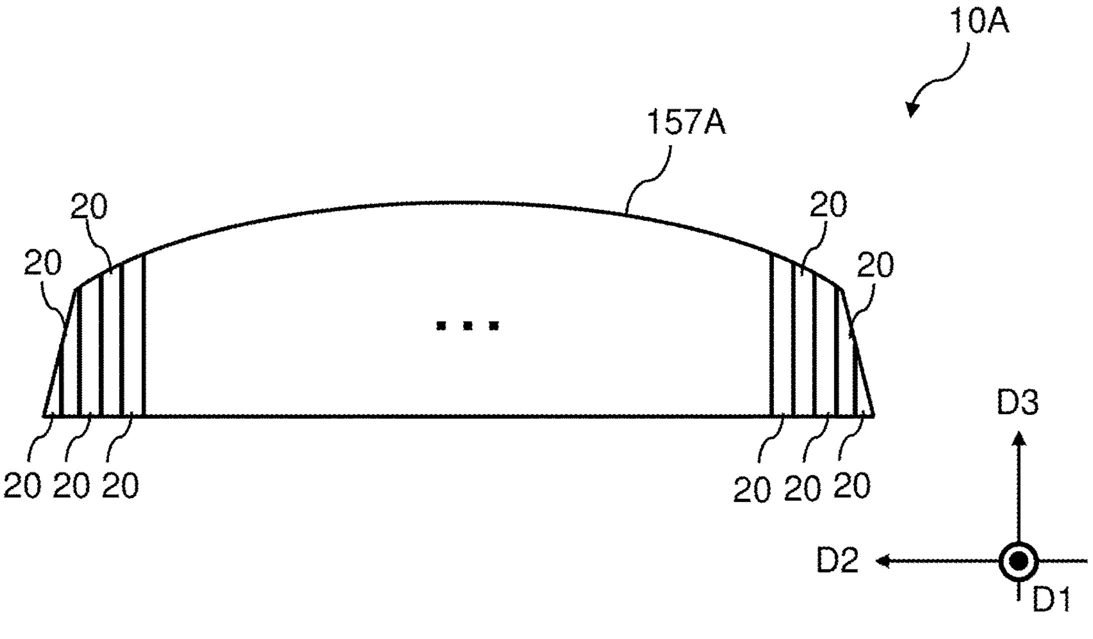
FIG. 10 is an enlarged longitudinal view of a heel of a reed according to another embodiment.

FIG. 10 is an enlarged view of a heel 157A of the reed 10A as viewed from a longitudinal direction D1 of the reed 10A. As shown in FIG. 10, the reed 10A includes the plurality of plastic sheets 20. Unlike the reed 10, the reed 10A is formed of a laminate in which the plurality of plastic sheets 20 are laminated along a short direction D2 of the reed 10A. That is, the short direction D2 of the reed 10A and the lamination direction of the plurality of plastic sheets 20 match each other in the present embodiment.

Figure 11:
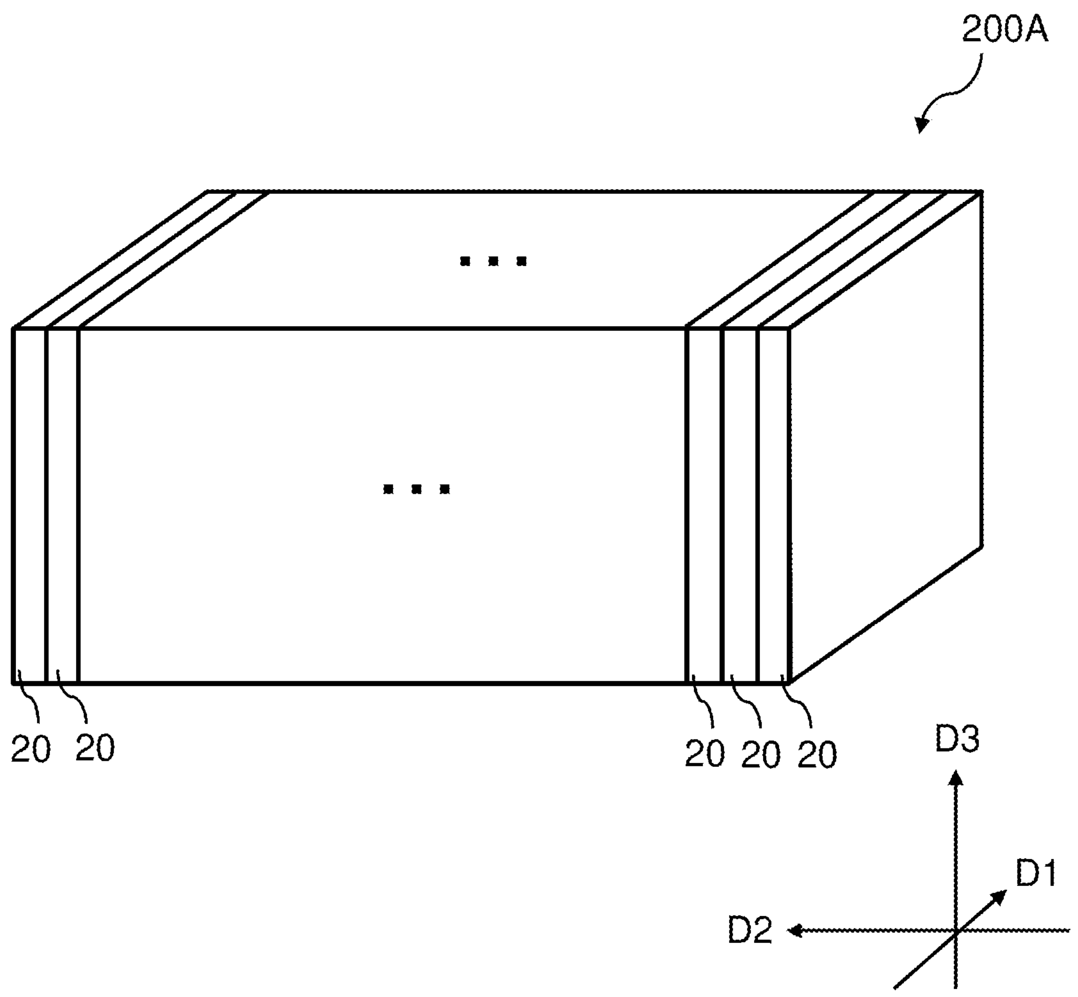
FIG. 11 is a schematic diagram showing a laminate including a plurality of plastic sheets according to another embodiment.

FIG. 11 is a schematic diagram showing a laminate 200A including the plurality of plastic sheets 20. The laminate 200A includes about 5 sheets to about 200 sheets of the plastic sheets 20 laminated to each other. As the plastic sheet 20, the plastic sheet 20 constituting the laminate 200 in the first embodiment can be used.

The laminate 200A may include configurations other than the plastic sheet 20. The laminate 200A may include any layers interposed between two adjacent plastic sheets 20. Although not shown in the drawing, for example, the laminate 200A may include an adhesive layer interposed between two adjacent plastic sheets 20. In addition, the laminate 200A may include a sheet made of another type of plastic that differs from the plurality of plastic sheets 20.

The reed 10A is manufactured by cutting the laminate 200A. As shown in FIG. 10, the lamination direction of the plurality of plastic sheets 20 constituting the reed 10A matches the short direction D2 of the reed 10A. In this case, the plate-shaped reed 10A is cut out from the laminate 200A along the lamination direction of the plurality of plastic sheets 20 so that the lamination direction of the plurality of plastic sheets 20 in the laminate 200A matches the short direction D2 of the reed 10A and the stretching direction of the plastic sheets 20 matches the longitudinal direction D1 of the reed 10A. Therefore, in the plate-shaped reed 10A cut out from the laminate 200A, elastic modulus of the reed 10A in the longitudinal direction D1 is larger than elastic modulus of the reed 10A in the short direction D2. In other words, rigidity of the reed 10A in the longitudinal direction D1 is greater than rigidity of the reed 10A in the short direction D2. Depending on the size of the plastic sheet 20, a plurality of reed 10A can be cut out from one laminate 200A.

Since each of the plurality of plastic sheets 20 constituting the reed 10A is the same as the plastic sheet 20 in the first embodiment, illustration thereof is omitted. The plastic sheet 20 includes the first layer 201 and a second layer 203 adjacent to the first layer 201. The anisotropy of the elastic modulus of the first layer 201 is different from the anisotropy of the elastic modulus of the second layer 203. The second layer 203 is adjacent to the first layer 201 in the lamination direction of the plurality of plastic sheets 20.

In at least one plastic sheet 20 of the plurality of plastic sheets 20 constituting the reed 10A, the elastic modulus in the stretching direction perpendicular to the lamination direction of the plastic sheet 20 is relatively larger than the elastic modulus in the non-stretching direction perpendicular to the lamination direction. In other words, the rigidity of the plastic sheet 20 in the stretching direction is relatively larger than the rigidity of the plastic sheet 20 in the non-stretching direction. In the plastic sheet 20, the elastic modulus in the stretching direction is equal to or greater than 1.1 times and equal to or less than 2.0 times the elastic modulus in the non-stretching direction.

For example, the elastic modulus of the each of the plastic sheets 20 constituting the laminate 200A in the stretching direction perpendicular to the lamination direction shown in FIG. 11 may be larger than the elastic modulus of the each of the plastic sheets 20 in the non-stretching direction perpendicular to both the lamination direction and the stretching direction. In this case, the stretching direction may be longitudinal direction D1 of the reed 10A, and the non-stretching direction may be a thickness direction D3 of the reed 10A.

As described above, by laminating the plurality of plastic sheets 20 having the anisotropy of the rigidity, the laminate 200A having anisotropy of rigidity is formed. Like the laminate 200A, the reed 10A cut out from the laminate 200A has anisotropy of rigidity. In other words, anisotropy of rigidity similar to the anisotropy of the rigidity of the plant-based reed can be imparted to the reed 10A. Therefore, the reed 10A can realize the same tone as that of the plant-based reed.

Further, the anisotropy of the rigidity of the reed 10A is realized not only by a surface of the reed 10A but also by the plurality of plastic sheets 20 constituting the reed 10A. Therefore, even if the reed 10A is surface-treated and the surface of the reed 10A is scraped in order to form the vamp 103 or the like after the reed 10A is cut out from the laminate 200A, the anisotropy of the rigidity of the reed 10A is maintained.

The method of manufacturing the reed 10A according to the present embodiment is the same as the method of manufacturing the reed 10 described with reference to FIG. 6 to FIG. 8 except the lamination direction of the plurality of plastic sheets and cutting out the plate from the laminate 200A along the lamination direction of the plurality of plastic sheets 20 when cutting out the plate to become the lead 10A from the laminate 200A including the plurality of plastic sheets 20, and thus detailed explanation thereof is omitted.

Modifications

The present disclosure is not limited to the embodiments described above, and includes various other modifications. For example, the embodiments described above have been described in detail for the purpose of showing the present disclosure in an easy-to-understand manner, and are not necessarily limited to those having all the described configurations. That is, a part of the configuration of each embodiment may be replaced with another configuration or may be deleted. Some modifications will be described below. The modifications described below can be applied to any of the first embodiment and the second embodiment described above.

Modification 1

The blowing part 1 of the present disclosure is not limited to the blowing part of the saxophone, and may be any blowing part of an aerophone. The aerophone may be a woodwind. For example, the woodwind include clarinet, oboe, fagot (bason), and the like in addition to saxophone. It is also applicable to folk instruments such as bagpipe and period instruments such as shawm.

Modification 2

In the embodiments described above, the reed is formed by laminating the plurality of plastic sheets 20 having the anisotropy in the rigidity. Each of the plastic sheets 20 includes the first layer 201 and the second layer 203 having different elastic modulus (rigidity) from each other. However, the reed of the present disclosure is not limited thereto. For example, a laminate including a plurality of plastic sheets may be formed by laminating a plurality of plastic sheets having uniform anisotropy of rigidity on the sheet itself.

Modification 3

In the embodiments described above, a 3D printed layer output by a 3D printer may be used instead of a plastic sheet. In this case, the 3D printed layer, like the plastic sheet, has anisotropic rigidity, and an elastic modulus in a longitudinal direction is greater than that in a short direction. The elastic modulus of the 3D printed layer in the longitudinal direction is equal to or greater than 1.1 times and equal to or less than 2.0 times the modulus in the short direction. In addition, the laminate 200, 200A in the embodiments described above may be formed by the 3D printer. Furthermore, a reed whose rigidity in the longitudinal direction is greater than the rigidity in the short direction may be produced by the 3D printer.

What is claimed is:

1. A reed for an aerophone, the reed comprising:

a plurality of plastic sheets laminated in a lamination direction perpendicular to a longitudinal direction of the reed, wherein at least one plastic sheet of the plurality of plastic sheets has a stretching direction and a non-stretching direction, both the stretching direction and the non-stretching direction being perpendicular to the lamination direction and perpendicular to each other wherein an elastic modulus in the stretching direction of the at least one plastic sheet of the plurality of plastic sheets is greater than an elastic modulus in the non-stretching direction of the at least one plastic sheet, and wherein the plurality of plastic sheets is laminated such that the stretching direction of the at least one plastic sheet corresponds to the longitudinal direction of the plastic sheet and the non-stretching direction of the at least one plastic sheet corresponds to a short direction of the plastic sheet perpendicular to both the longitudinal direction of the plastic sheet and the lamination direction.

2. The reed according to claim 1, wherein the elastic modulus in the stretching direction of the at least one plastic sheet is equal to or greater than 1.1 times and equal to or less than 2.0 times the elastic modulus in the non-stretching direction of the at least one plastic sheet.

3. The reed according to claim 1, wherein the elastic modulus in the longitudinal direction of the reed is equal to or greater than 1.1 times and equal to or less than 2.0 times the elastic modulus in a short direction of the reed.

4. The reed according to claim 1, wherein:

the at least one plastic sheet of the plurality of plastic sheets comprises a first layer and a second layer adjacent to the first layer in the lamination direction; and an anisotropy of an elastic modulus of the first layer is different from an anisotropy of an elastic modulus of the second layer.

5. The reed according to claim 1, wherein the lamination direction is a same direction as a short direction of the reed.

6. The reed according to claim 1, wherein the lamination direction is a direction perpendicular to both the longitudinal direction of the reed and a short direction of the reed.

7. A reed manufacturing method comprising:

preparing a plurality of plastic sheets, each plastic sheet of the plurality of plastic sheets having anisotropy;

forming a laminate by laminating the plurality of plastic sheets with the anisotropy aligned; and cutting out a plate from the laminate to form the reed such that an elastic modulus in a longitudinal direction of the reed is greater than an elastic modulus in a short direction of the reed perpendicular to the longitudinal direction of the reed.

8. The reed manufacturing method according to claim 7, wherein the elastic modulus in the longitudinal direction of the reed is equal to or greater than 1.1 times and equal to or less than 2.0 times the elastic modulus in the short direction of the reed.

9. The reed manufacturing method according to claim 7, wherein at least one plastic sheet of the plurality of plastic sheets comprises a first layer and a second layer adjacent to the first layer in a lamination direction; and an anisotropy of an elastic modulus of the first layer is different from an anisotropy of an elastic modulus of the second layer.

10. The reed manufacturing method according to claim 7, wherein cutting out the plate includes cutting out the plate from the laminate along a lamination direction of the plurality of plastic sheets.

11. The reed manufacturing method according to claim 7, wherein cutting out the plate includes cutting out the plate from the laminate along a direction perpendicular to a lamination direction of the plurality of plastic sheets.

12. A plastic sheet for a reed of an aerophone, the plastic sheet having an elastic modulus in a stretching direction of the plastic sheet equal to or greater than 1.1 times and equal to or less than 2.0 times the elastic modulus in a non-stretching direction of the plastic sheet, wherein the stretching direction of the plastic sheet is a same direction as a longitudinal direction of the reed, wherein the reed is formed by laminating a plurality of plastic sheets, and wherein the longitudinal stretching direction and the short non-stretching direction are perpendicular to a lamination direction of the plurality of plastic sheets and perpendicular to each other.

13. A reed for an aerophone, the reed comprising:

a plurality of plastic sheets laminated in a lamination direction perpendicular to a longitudinal direction of the reed, wherein an elastic modulus in a longitudinal direction of the at least one plastic sheet of the plurality of plastic sheets is greater than an elastic modulus in a direction perpendicular to both the lamination direction and the longitudinal direction of the at least one plastic sheet, and wherein the lamination direction is a direction perpendicular to both the longitudinal direction of the reed and a short direction of the reed.

14. The reed according to claim 13, wherein the elastic modulus in the longitudinal direction of the at least one plastic sheet is equal to or greater than 1.1 times and equal to or less than 2.0 times the elastic modulus in a short direction of the at least one plastic sheet.

15. The reed according to claim 13, wherein the elastic modulus in the longitudinal direction of the reed is equal to or greater than 1.1 times and equal to or less than 2.0 times the elastic modulus in a short direction of the reed.

16. The reed according to claim 13, wherein:

the at least one plastic sheet of the plurality of plastic sheets comprises a first layer and a second layer adjacent to the first layer in the lamination direction; and an anisotropy of an elastic modulus of the first layer is different from an anisotropy of an elastic modulus of the second layer.

* * * * *